US010324313B2

(12) United States Patent
Jain et al.

(10) Patent No.: US 10,324,313 B2
(45) Date of Patent: Jun. 18, 2019

(54) GRADED INDEX SINGLE CRYSTAL ACTIVE WAVEGUIDE IN GLASS

(71) Applicant: Lehigh University, Bethlehem, PA (US)

(72) Inventors: Himanshu Jain, Bethlehem, PA (US); Volkmar Dierolf, Allentown, PA (US); Keith J. Veenhuizen, Lebanon, PA (US)

(73) Assignee: LEHIGH UNIVERSITY, Bethlehem, PA (US)

( * ) Notice: Subject to any disclaimer, the term of this patent is extended or adjusted under 35 U.S.C. 154(b) by 0 days.

(21) Appl. No.: 15/816,794

(22) Filed: Nov. 17, 2017

(65) Prior Publication Data

US 2018/0136493 A1 May 17, 2018

Related U.S. Application Data

(60) Provisional application No. 62/423,465, filed on Nov. 17, 2016.

(51) Int. Cl.
| | |
|---|---|
| *G02B 6/12* | (2006.01) |
| *G02F 1/00* | (2006.01) |
| *G02F 1/035* | (2006.01) |
| *G02B 6/13* | (2006.01) |
| *G02B 6/122* | (2006.01) |

(52) U.S. Cl.
CPC ........... *G02F 1/0018* (2013.01); *G02B 6/122* (2013.01); *G02B 6/13* (2013.01); *G02F 1/035* (2013.01); *G02B 2006/12095* (2013.01); *G02F 2202/20* (2013.01); *G02F 2203/07* (2013.01)

(58) Field of Classification Search
None
See application file for complete search history.

(56) References Cited

U.S. PATENT DOCUMENTS

| 9,069,117 | B1 * | 6/2015 | Ballato | .............. G02B 6/02033 |
| 2011/0103756 | A1 * | 5/2011 | Rice | .................... C03B 37/0235 |
| | | | | 385/123 |
| 2014/0378328 | A1 * | 12/2014 | Chakravarty | ........ B01J 19/0046 |
| | | | | 506/9 |

OTHER PUBLICATIONS

Stone, A. et al., "Direct laser-writing of ferroelectric single-crystal waveguide architectures in glass for 3D integrated optics," Scientific Reports, 5:10391, pp. 1-10, 2015.
He, X. et al., "Size-controlled oriented crystallization in SiO2-based glasses by femtosecond laser irradiation," J. Opt. Soc. Am. B, vol. 31, Issue 2, pp. 376-381, Feb. 2014.
Uchida, T. et al., "Optical Characteristics of a Light-Focusing Fiber Guide and Its Applications," IEEE Journal of Quantum Electronics, vol. QE-6, No. 10, pp. 606-612, Oct. 1970.

* cited by examiner

*Primary Examiner* — Tina M Wong
(74) *Attorney, Agent, or Firm* — Fisherbroyles, LLP

(57) ABSTRACT

In one aspect the invention provides a graded refractive index single crystal waveguide having a glass block containing at least one crystal core, the crystal core having a central portion extending along an axis from a first end to a second end; an interface defining a peripheral boundary of the crystal core at a junction of the crystal core and an adjacent portion of the glass block, and a continuous, radially symmetric misorientation transverse to the central portion; wherein the misorientation has a misorientation angle that increases with increasing distance from the central portion towards the interface.

7 Claims, 15 Drawing Sheets

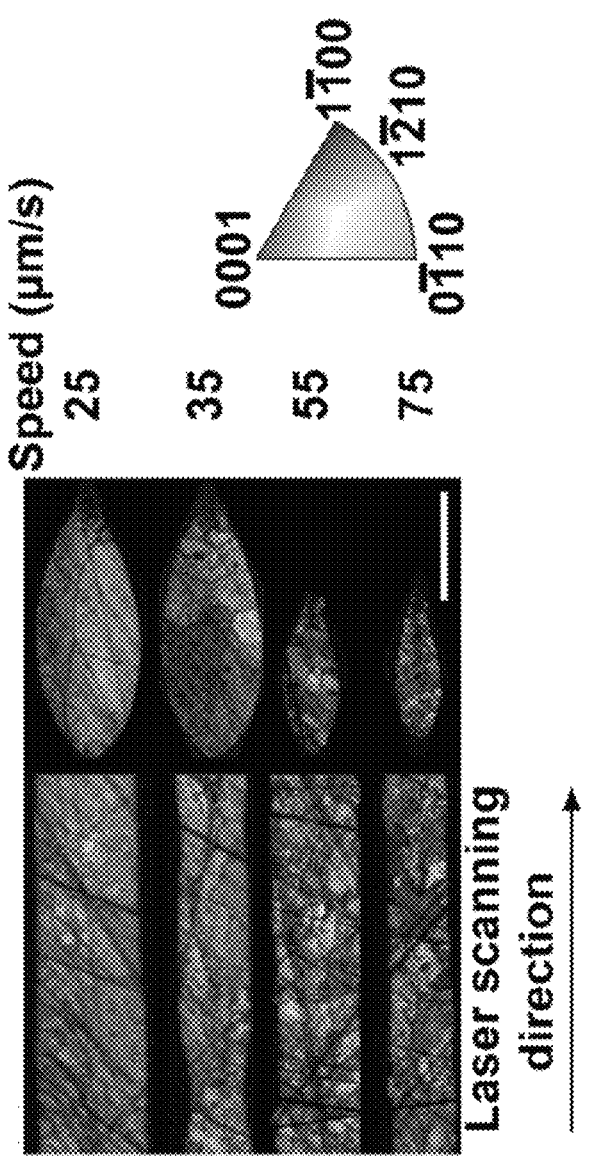
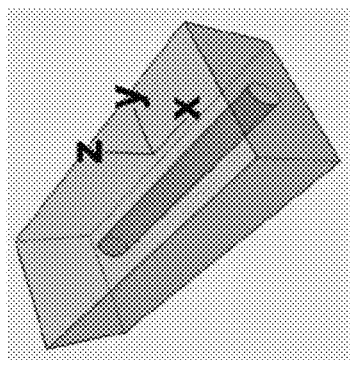
FIG. 1A
FIG. 1B
FIG. 1C

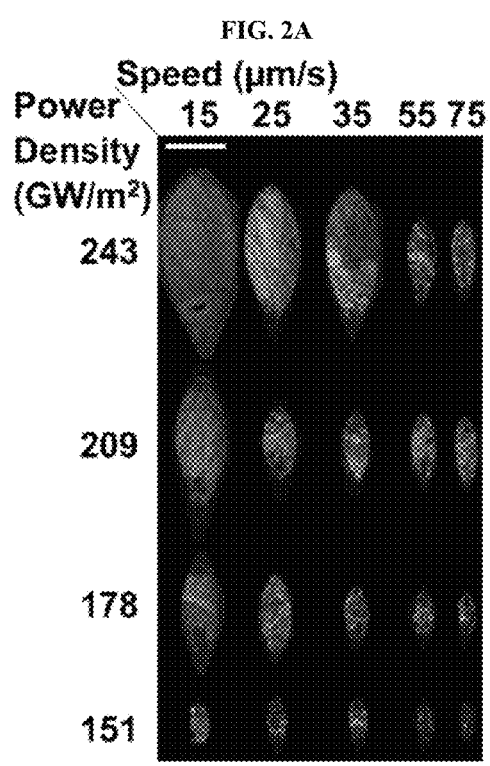
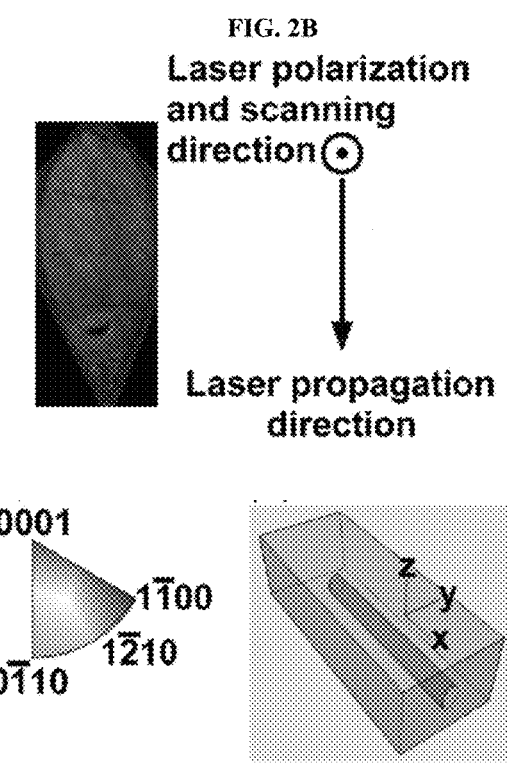
FIG. 2A
FIG. 2B
FIG. 2C
FIG. 2D

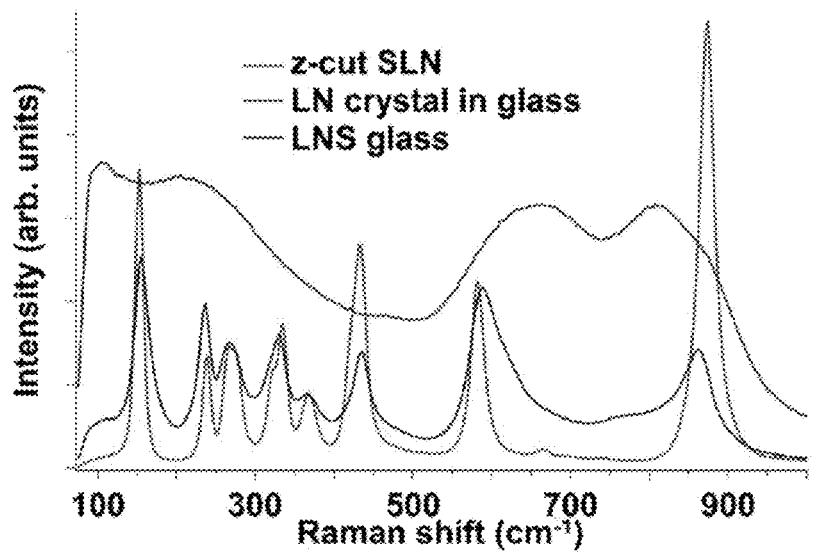 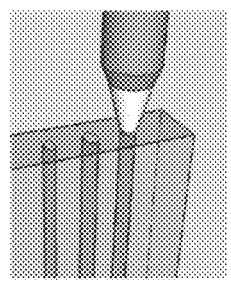
FIG. 3A
FIG. 3B
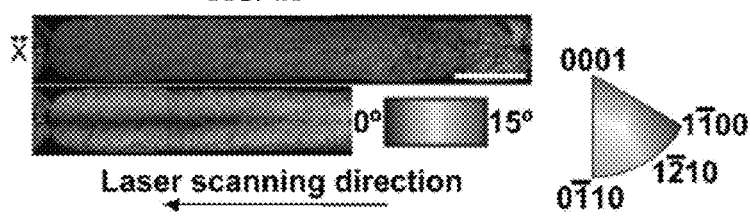 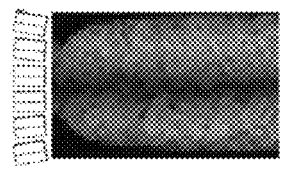
FIG. 4A
FIG. 4B
FIG. 4C
FIG. 4D

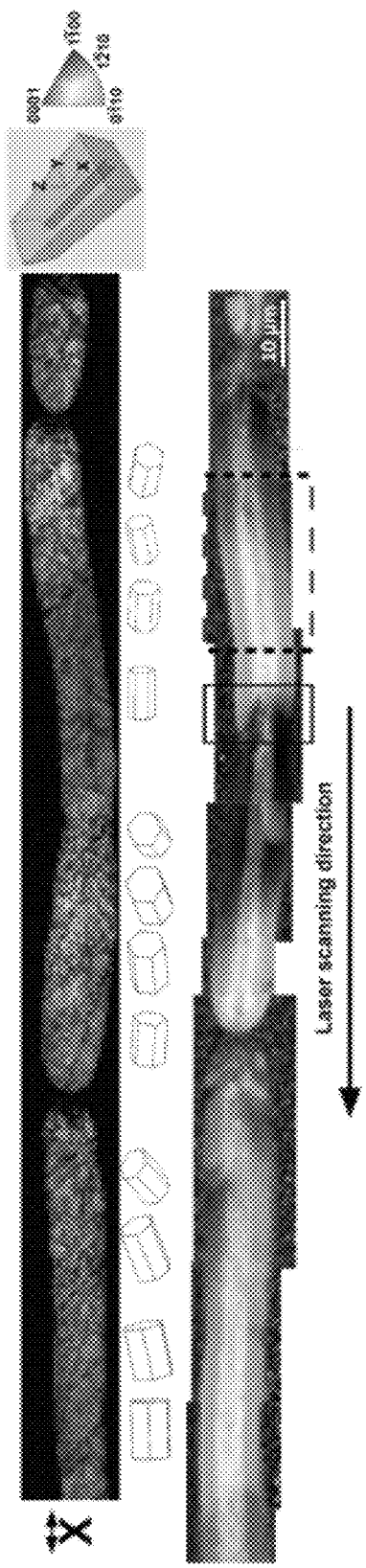
FIG. 12A
FIG. 12B
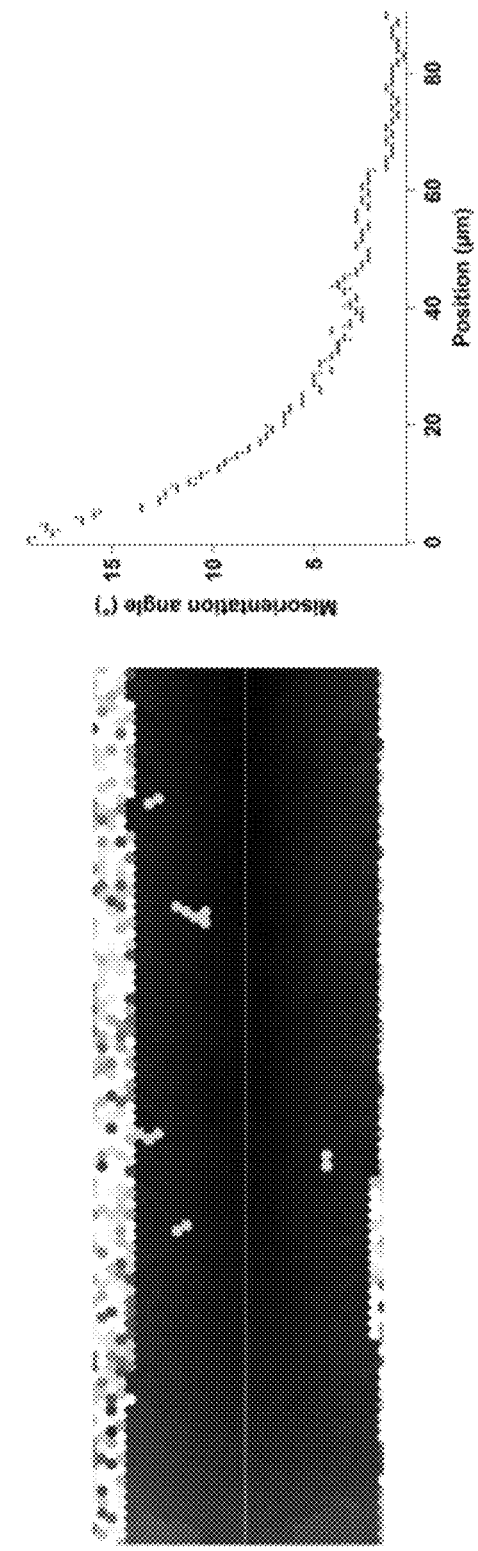
FIG. 13B
FIG. 13A

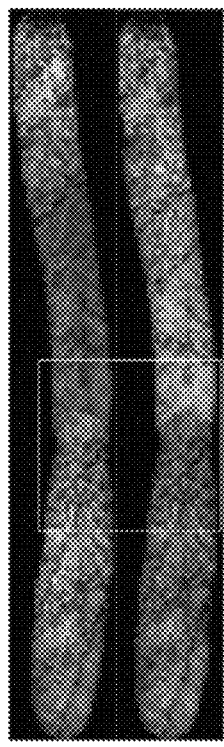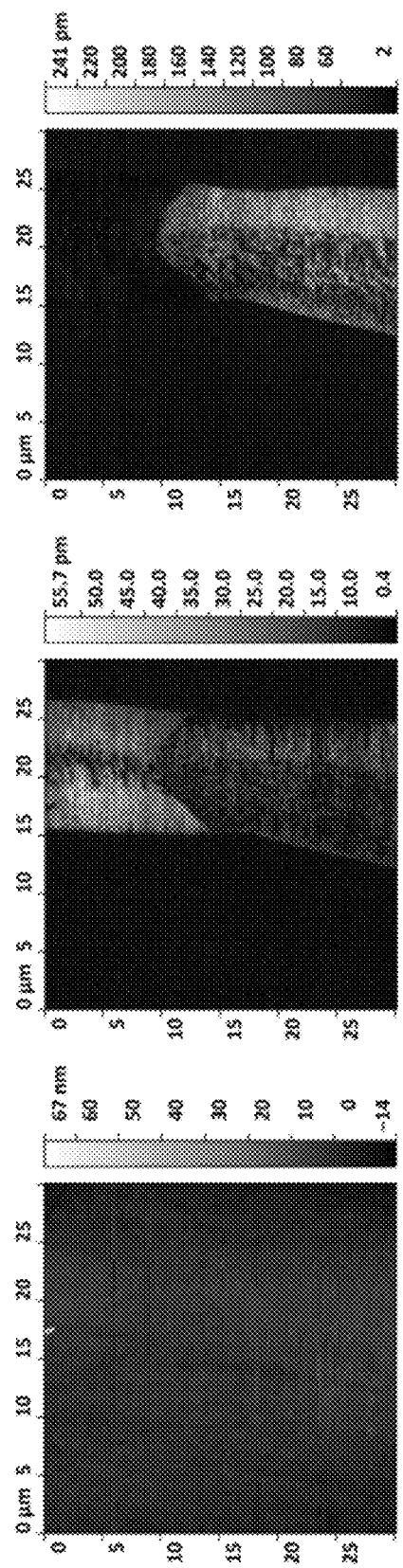
FIG. 17A
FIG. 17B
FIG. 17C
FIG. 17D

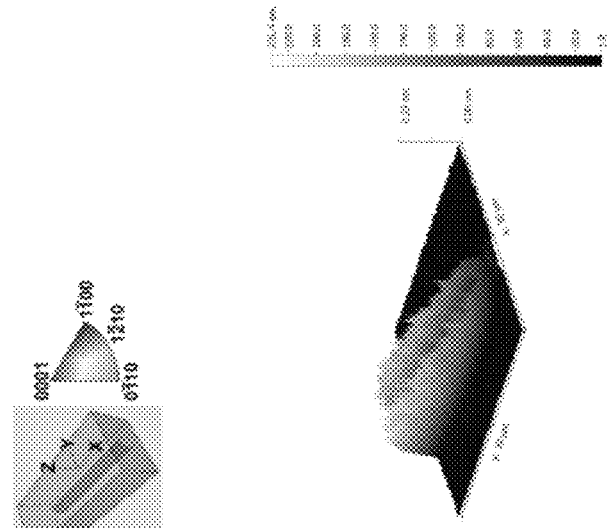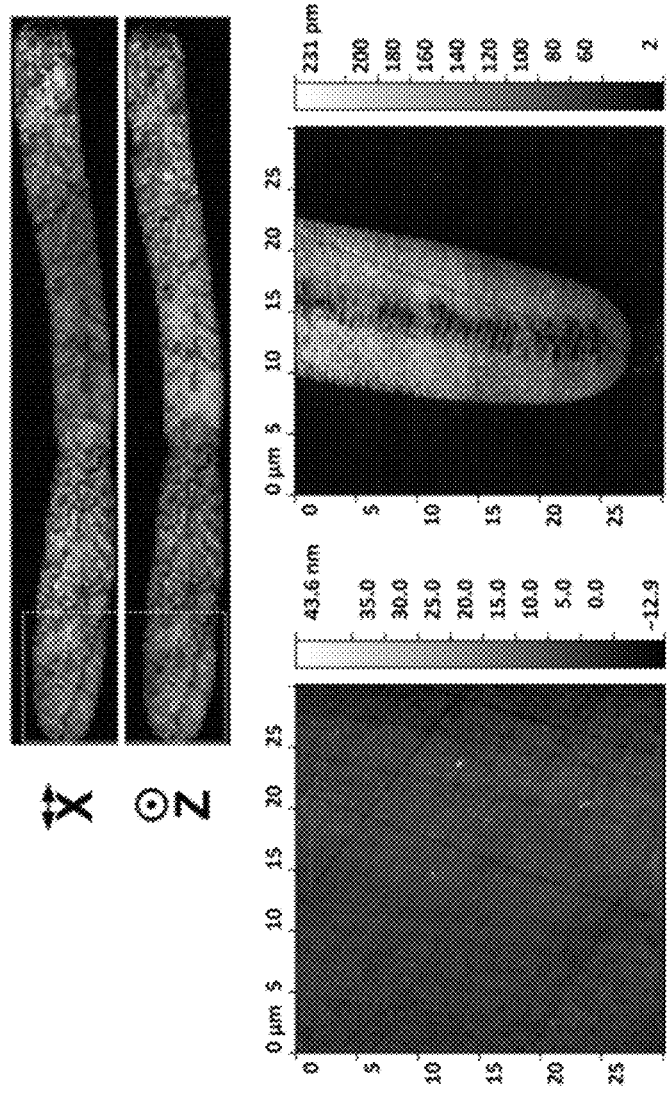
FIG. 18A
FIG. 18B
FIG. 18C
FIG. 18D

GRADED INDEX SINGLE CRYSTAL ACTIVE WAVEGUIDE IN GLASS

CROSS-REFERENCE TO RELATED APPLICATIONS

This application claims the benefit of priority of provisional application No. 62/423,465, filed Nov. 17, 2016, which is hereby incorporated by reference.

STATEMENT REGARDING FEDERALLY SPONSORED RESEARCH OR DEVELOPMENT

This invention was made with government support under the National Science Foundation, grant number DMR-1508177. The government has certain rights in the invention.

BACKGROUND OF THE INVENTION

Modern telecommunications relies on the transmission of data through an extremely low loss medium such as optical fibers. In the push towards miniaturizing and integrating optical components, as has been done in the electronics industry, new waveguides are needed. There is a need in the art for economically efficient low-loss waveguides. This disclosure addresses that need.

FIELD OF THE INVENTION

This invention pertains to grade refractive index single crystal waveguides and methods of making the same.

BRIEF SUMMARY OF THE INVENTION

In one aspect the invention provides a graded refractive index single crystal waveguide having a glass block containing at least one crystal core, the crystal core having a central portion extending along an axis from a first end to a second end; an interface defining a peripheral boundary of the crystal core at a junction of the crystal core and an adjacent portion of the glass block, and a continuous, radially symmetric misorientation transverse to the central portion; wherein the misorientation has a misorientation angle that increases with increasing distance from the central portion towards the interface.

In various embodiments, the crystal core is uniaxial and has negative birefringence.

In various embodiments, the crystal core is oriented along the central portion of the crystal core.

In various embodiments, the crystal core comprises $LiNbO_3$.

In various embodiments, the glass block comprises $35Li_2O\text{-}35Nb_2O_5\text{-}30SiO_2$ glass.

In various embodiments, the misorientation angle reaches a maximum of about 15° at the interface of the crystal core.

In various embodiments, the misorientation has a slope between about 0.5°/μm and about 2°/μm In a further aspect, the invention provides a method of making a graded refractive index single crystal waveguide, by providing a block of glass; focusing a plurality of femtosecond (fs) laser pulses having a power density on a focal point within the block of glass, thereby heating the glass and inducing crystallization; translating the focal point through the glass along an axis at a scanning speed, thereby generating a single crystal within the glass, the crystal comprising a lattice oriented along the axis, wherein the single crystal comprises a central portion extending along the axis, an interface defining a peripheral boundary of the crystal core at a junction of the crystal core and an adjacent portion of the glass block and a continuous, radially symmetric misorientation transverse to the central portion; wherein the misorientation has a misorientation angle that increases with increasing distance from the central portion towards the interface.

In various embodiments, the misorientation angle reaches a maximum of about 15° at the interface of the crystal core.

In various embodiments, the glass comprises $35Li_2O\text{-}35Nb_2O_5\text{-}30SiO_2$ glass.

In various embodiments, the crystal core comprises $LiNbO_3$.

In various embodiments, the power density is between about 151 $GW/m^2$ and about 243 $GW/m^2$.

In various embodiments, the laser scanning speed is between about 15 and about 75 μm/s.

In various embodiments, the power density and scanning speed are 243 $GW/m^2$ and 15 μm/s; 243 $GW/m^2$ and 25 μm/s; or 209 $GW/m^2$ and 15 μm/s, respectively.

In various embodiments, the plurality of pulses has a frequency of about 200 kHz.

BRIEF DESCRIPTION OF THE DRAWINGS

The following detailed description of illustrative embodiments of the invention will be better understood when read in conjunction with the appended drawings. For the purpose of illustrating the invention, certain illustrative embodiments are shown in the drawings. It should be understood, however, that the invention is not limited to the precise arrangements and instrumentalities of the embodiments shown in the drawings.

FIGS. 1A-C depict the effect of laser scanning speed on laser-induced formation of $LiNbO_3$ crystals in glass. FIG. 1A depicts top and cross-section views of x-axis IPF maps for crystal lines written at a power density of 243 $GW/m^2$ and at a scanning speed of 25, 35, 55, or 75 μm/s. Scale bar corresponds to 25 μm. FIG. 1B depicts an inverse pole figure which assigns crystal directions to a certain shade. FIG. 1C depicts the coordinate system used: the x-axis is parallel to laser scanning direction; the z-axis is perpendicular to sample surface; the y-axis is perpendicular to the x-axis and z-axis.

FIGS. 2A-D depict the effect of laser power density and scanning speed on laser-induced formation of $LiNbO_3$ crystals in glass. FIG. 2A depicts a cross-section view of x-axis IPF maps for crystal lines grown at a variety of laser scanning speeds and power densities. Scale bar corresponds to 25 μm. FIG. 2B depicts a close-up view of a crystal cross-section with laser parameters defined. FIG. 2C depicts an inverse pole figure. FIG. 2D depicts the coordinate system.

FIGS. 3A and 3B depict Raman spectroscopy of $LiNbO_3$ crystal in glass. FIG. 3A depicts Raman spectra acquired in a backscattering geometry for a c-axis oriented crystal line (grown at 209 $GW/m^2$ and 15 μm/s) and bulk z-cut stoichiometric $LiNbO_3$. FIG. 3B depicts a schematic of backscattering geometry.

FIGS. 4A-D depict lattice misorientation in laser induced crystal in glass. FIG. 4A x-axis IPF map of a crystal line grown at 209 $GW/m^2$ and 15 μm/s showing highly oriented growth over a 100 μm length. Scale bar corresponds to 25 μm. FIG. 4B depicts a map of angular misorientation with respect to the c-axis oriented along the laser scanning direction. FIG. 4C depicts an inverse pole figure. FIG. 4D depicts a close-up view of the misorientation map at the left end of the crystal line along with lattices to illustrate the misorientation.

FIG. 6A depicts IPF maps of a crystal line grown at 243 GW/m$^2$ and 25 μm/s showing tendency for lattice rotation to the c-axis parallel with the laser scanning direction. Scale bar corresponds to 25 μm. FIG. 6B depicts an inverse pole figure. FIG. 6C depicts the coordinate system.

FIGS. 12A and 12B depict a comparison of the x-axis IPF map, collected by electron backscatter diffraction (EBSD) (FIG. 12A) with its Raman map (FIG. 12B). The scale bar corresponds to 10 μm.

FIG. 13A depicts a rotation grayscale map.

FIG. 13B depicts the corresponding line profile taken along the white line in FIG. 13A.

FIG. 17A depicts x-axis and z-axis IPF maps of a crystal line (composition: LNS 34, laser power: 415 mW, laser scanning speed: 5 μm/s) with the region of interest scanned by the PFM contained in the white box.

FIG. 17B depicts a map of the surface roughness.

FIG. 17C depicts a map of the lateral piezoresponse amplitudes of the crystal.

FIG. 17D depicts a map of the vertical piezoresponse amplitudes of the crystal.

FIG. 18A depicts x-axis and z-axis IPF maps of a crystal line (composition: LNS 34, laser power: 415 mW, laser scanning speed: 5 μm/s) with the region of interest scanned by the PFM contained in the white box.

FIG. 18B depicts a map of the surface roughness.

FIG. 18C depicts a map of the lateral piezoresponse amplitudes of the crystal.

FIG. 18D depicts a map of the vertical piezoresponse amplitudes of the crystal.

DETAILED DESCRIPTION OF THE INVENTION

Definitions

Figure 5A:
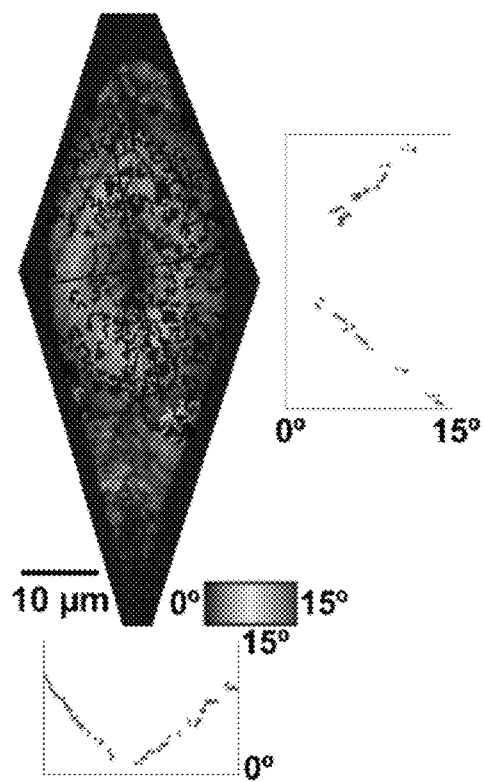
FIGS. 5A and 5B depict line profiles of lattice misorientation in laser induced crystals in glass. Cross-section view of angular misorientation with respect to the c-axis orientation in the center of the crystal for crystal lines grown at 209 GW/m$^2$ and 15 μm/s (FIG. 5A) and 243 GW/m$^2$ and 15 μm/s (FIG. 5B). The graphs below and to the right of each map are line profiles taken along the black lines on each map.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described. As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Misorientation" as used herein means changes in lattice orientation as one traverses (typically radially outward) transverse to the laser scanning direction.

"Misorientation angle" as used herein means the angle of deviation of lattice orientation relative to the center of the waveguide.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 and so forth, as well as individual numbers within that range, for example, 1, 2, 2.7, 3, 4, 5, 5.3, and 6. This applies regardless of the breadth of the range.

Description

The invention is based in part on the development of a device called a graded index single crystal (GRISC) waveguide in glass and a method for fabricating the device. The fabrication method has been verified by initial observations from electron backscatter diffraction data collected on commercially important lithium niobate crystal lines formed in glass as shown in the figures and examples. In various embodiments, such waveguides achieve significantly reduced transmission losses by confining transmitted light to a tighter region in the core of the crystal.

Graded Refractive Index Single Crystal Waveguides

In one aspect the invention provides a graded refractive index single crystal waveguide having a glass block containing at least one crystal core, the crystal core having a central portion extending along an axis from a first end to a second end; an interface defining a peripheral boundary of the crystal core at a junction of the crystal core and an adjacent portion of the glass block, and a continuous, radially symmetric misorientation transverse to the central portion; wherein the misorientation has a misorientation angle that increases with increasing distance from the central portion towards the interface.

Figure 7:
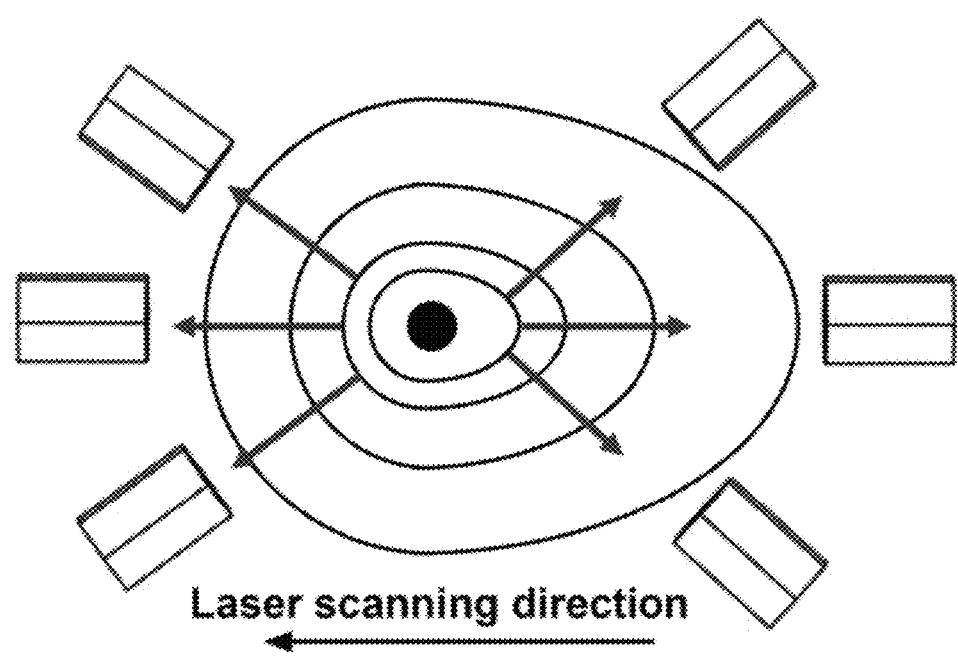
FIG. 7 depicts a schematic of the temperature profile around the focus (the black dot) of the femtosecond laser with isotherms shown as black lines and the temperature gradient shown as arrows. The growth mode during heating with corresponding alignment of unit cells along the temperature gradient is shown on the left at the leading end of the laser focus.
Figure 8A:
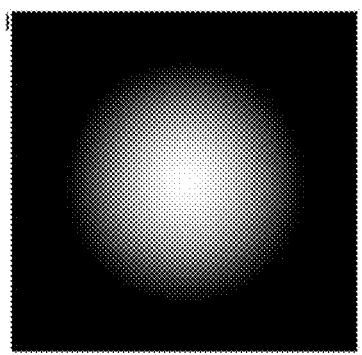
FIGS. 8A-D depict optical waveguide modeling of laser induced crystals in glass. Fundamental quasitransverse electric field mode profiles for 10 μm radius step index (FIG. 8A) and graded index waveguides (FIG. 8C). The corresponding step (FIG. 8B) and graded refractive index (FIG. 8D) profiles are shown beneath each mode profile. Note the different y-axis for each of the refractive index profiles.
Figure 8B:
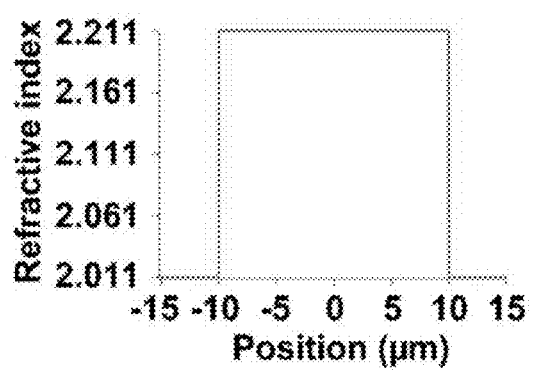
Figure 8C:
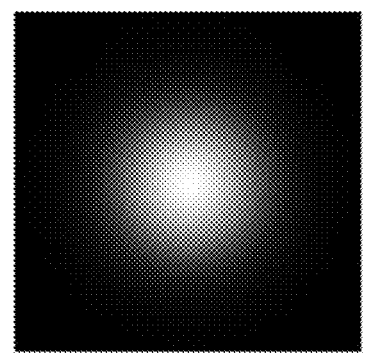
Figure 8D:
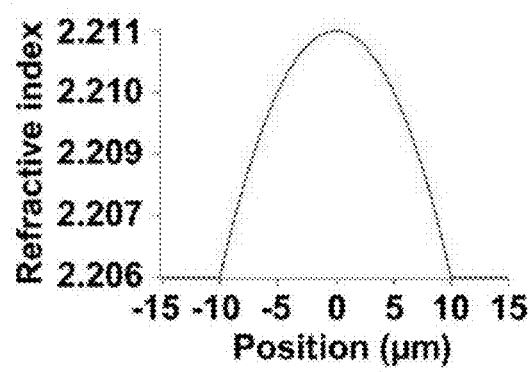

Without meaning to be limiting, in various embodiments the highly oriented crystal waveguide in glass described herein does not exhibit the grain boundaries of polycrystalline lines while improving upon single crystal waveguides with one orientation by eliminating the losses at the rough-crystal glass interface. These losses are eliminated in the highly oriented single crystal lines through a tighter confinement of the transmitted light at the center of the crystal, away from the interface, because of the graded refractive index profile of the graded refractive index single crystal waveguide (FIGS. 7 and 8).

Although various embodiments of the waveguide may be cylindrical or roughly cylindrical, a skilled person will recognize that the shape of the block of glass, thereby defining the exterior shape of the waveguide, is limited only by the shape that the glass will hold. In various embodiments, the block of glass may be rectangular. In various embodiments, the crystal core may be within a roughly planar block of glass having various thicknesses. In various embodiments, the glass block may be a cylinder.

The first end and second end of the waveguide are defined by the ends of the crystal core, more specifically the ends of the axis. In various embodiments, light travels from the first end to the second end through the crystal core, along or parallel to the central portion, and the lattice orientation of the crystal and the radially symmetric misorientation confines or partially confines light within the crystal core, away from the crystal/glass interface and avoids the inefficiencies associated with losses at the rough-crystal glass interface.

The crystal core is a single crystal that extends through the block of glass, thereby defining the first and second end. In various embodiments, the crystal is a uniaxial crystal with a lattice oriented along the length of the core. In certain embodiments, the waveguide will include more than one crystal core, each of which is a single crystal, for example running parallel to each other. In various embodiments, the crystal cores are discrete and there is no direct contact between the cores. A person of skill in the art will appreciate the distinction between multiple single crystal waveguides, by way of non-limiting example, in a single block of glass and a polycrystal. In various embodiments, the crystal core is a uniaxial crystal and has negative birefringence. In various embodiments, the crystal core is or includes $LiNbO_3$.

In various embodiments, the glass block completely or substantially completely covers the crystal core. In various embodiments, the glass block extends from the first end to the second end. In various embodiments, the glass block does not cover the crystal core at the first end and/or the second end. As the term is used here, "covers" means that the glass block contains the crystal core within the volume of the glass. In various embodiments, the glass block may comprise $35Li_2O$-$35Nb_2O_5$-$30SiO_2$.

Figure 10A:
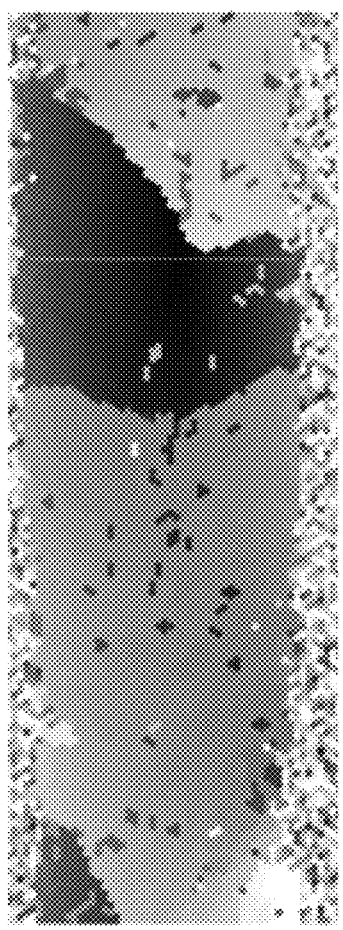
FIG. 10A depicts a misorientation grayscale map.
Figure 10B:
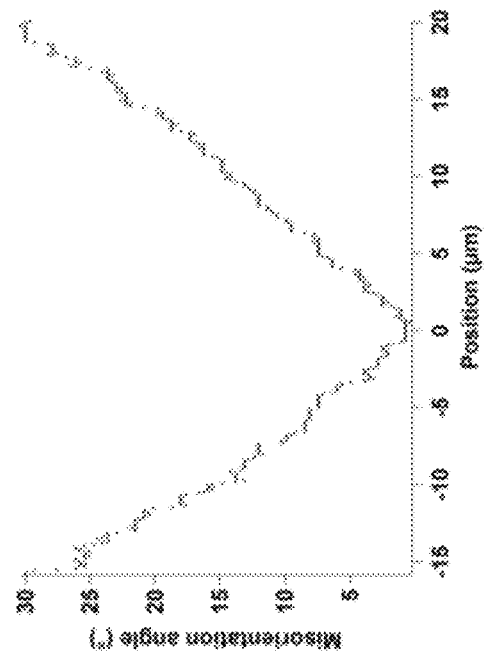
FIG. 10B depicts a corresponding line profile taken along the white line in FIG. 10A.
Figure 11:
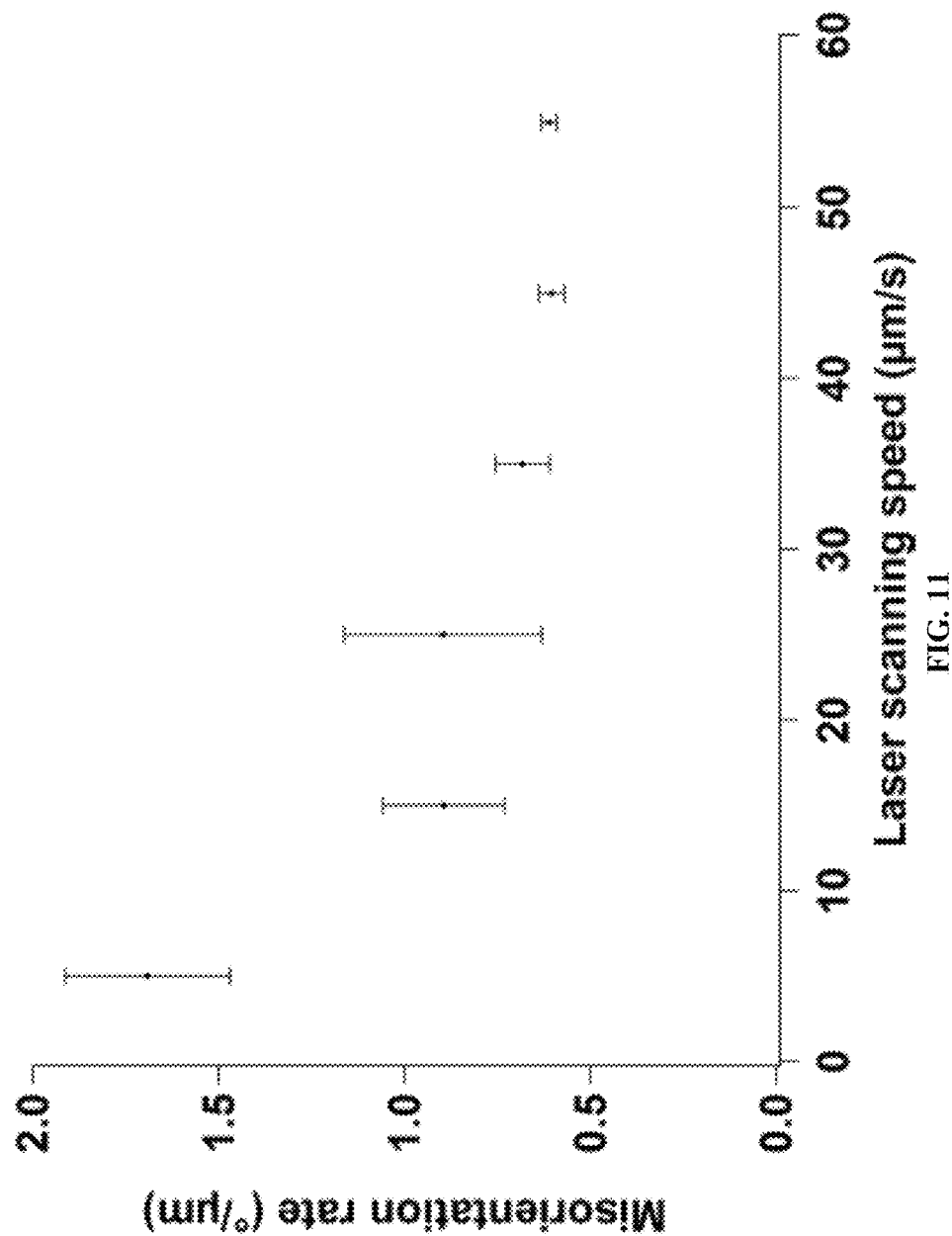
FIG. 11 depicts variation of misorientation rate with laser scanning speed.

The central portion of the crystal core is the radial line along an axis from the first end to the second end, along which the lattice is oriented. A skilled person will recognize that the axis is not necessarily a straight line but could be, in various embodiments, curved or twisted or have one or more turns. The interface is the outer surface of the crystal core, though not generally the outer surface of the device, and is at some distance transverse from the central portion, typically at the interface between the crystal core and the adjacent portion of the glass block. The crystal core has a continuous, radially symmetric lattice misorientation transverse to the central portion, the misorientation having a misorientation angle that increases from the center of the crystal core to the interface. The misorientation is described as continuous and radially symmetric because the misorientation angle increases smoothly, or relatively smoothly, as a function of distance from the center. The misorientation angle has a minimum in the center and a maximum at the interface. Although the exact size of the central portion of the crystal core is unimportant for the practice of the invention, it can generally be considered to be the region in the center of the crystal core where the misorientation angle is zero, near zero or at its minimum. In various embodiments, the misorientation angle reaches a maximum of about 15° at the interface of the crystal core. In various embodiments, the misorientation has a slope between about 0.5°/μm and about 2°/μm. The slope of the misorientation is illustrated in FIGS. 5 and 10.

Figure 9:
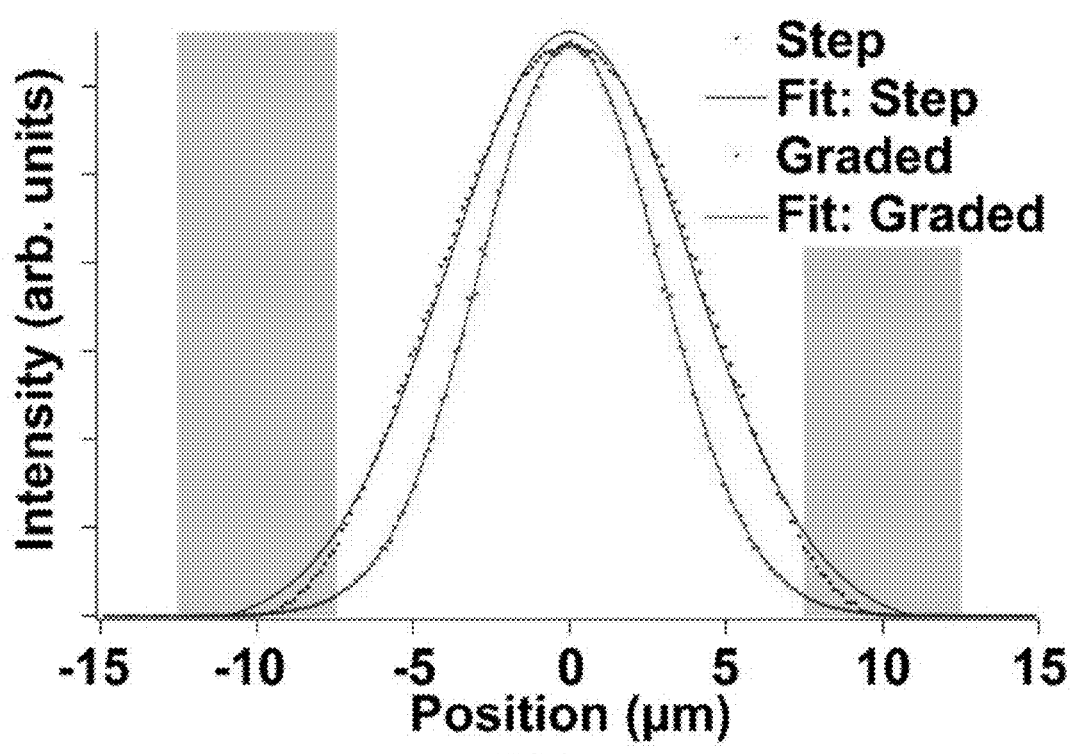
FIG. 9 depicts a comparison of different waveguide intensity profiles at crystal-glass interface. Intensity line profiles of the fundamental modes for step index and graded index waveguides with their corresponding Gaussian fits. Shaded areas highlight the crystal-glass interface.

Further discussion of the misorientation and its effects on the refractive index of the crystal may be found in the figures and in the examples below. In particular, FIG. 5 illustrates profiles of lattice misorientation in various embodiments. FIG. 7 shows the alignment of unit cells along the temperature gradient at the leading end of the laser focus that, in various embodiments, may be used as a method of making the claimed waveguides. FIG. 9 illustrates intensity profiles of various embodiments and highlights how various embodiments may reduce or avoid loss at the outer surface of the crystal core where the crystal interfaces with the glass block.

The invention is not limited to any particular application, however possible applications include photonics technologies and telecommunications. GRISC can be used as a low loss optical waveguide to improve integrated optics devices such as electro-optic modulators. With rare earth doping, GRISC can be used in optical quantum memory applications.

Methods of Making Graded Refractive Index Single Crystal Waveguides

In a further aspect, the invention provides a method of making a graded refractive index single crystal waveguide, by providing a block of glass; focusing a plurality of femtosecond (fs) laser pulses having a power density on a focal point within the block of glass, thereby heating the glass and inducing crystallization; translating the focal point through the glass along an axis at a scanning speed, thereby generating a single crystal within the glass, the crystal comprising a lattice oriented along the axis, wherein the single crystal comprises a central portion extending along the axis, an interface defining a peripheral boundary of the crystal core at a junction of the crystal core and an adjacent portion of the glass block and a continuous, radially symmetric misorientation transverse to the central portion;

wherein the misorientation has a misorientation angle that increases with increasing distance from the central portion towards the interface.

The method produces a graded index single crystal (GRISC) in glass through control of the temperature distribution induced by femtosecond laser heating. GRISC waveguides confine the transmitted light within a tight region away from the crystal-glass interface. As this interface is largely responsible for light scattering losses observed in previously fabricated single crystal lines, GRISC waveguides offer reduced optical loss while providing active functionality.

Providing may, in various embodiments, encompass manufacturing the glass as described in Example 1 or acquiring by any means. In various embodiments, the glass may be any type of glass that may undergo laser induced crystallization. In various embodiments the glass is or includes $35Li_2O$-$35Nb_2O_5$-$30SiO_2$. The block of glass may be in any amount or shape, limited only by the precision with which the laser may be controlled.

A plurality of fs laser pulses are focused on a focal point within the block of glass. The focal point is the focus of the laser. Heat generated by the pulses induces crystallization. The focal point of the laser is translated along an axis through the block of glass, inducing crystallization and forming a single crystal along that axis. A skilled person will recognize that the axis is not necessarily a straight line, but rather is defined by the path of the laser. In various embodiments, the crystal is $LiNbO_3$.

In various embodiments, the axis begins and/or terminates at an edge of the block of glass. In these embodiments, the crystal extends throughout the block of glass. In other embodiments the axis is entirely within the block of glass and therefore the single crystal is completely contained within the block of glass. In various figures and examples herein, the axis is referred to as the x-axis.

Selection of the power density applied and the scanning speed at which the focal point of the laser is translated through the glass influences the temperature profile and therefore the crystallization and ultimately the properties of the GRISC. In various embodiments, the laser scanning speed is within the range between about 15 and about 75 µm/s. In various embodiments, the laser power density (power density) is within the range between about 151 $GW/m^2$ (515 mW) and about 243 $GW/m^2$ (830 mW). In various embodiments, the power density and scanning speed are 243 $GW/m^2$ and 15 µm/s; 243 $GW/m^2$ and 25 µm/s; and 209 $GW/m^2$ and 15 µm/s, respectively. A skilled person will recognize that, based on the present disclosure, a person of skill in the art is able to determine further parameters for the laser and the motion by which it is moved along the path that will produce the claimed GRISCs and these are all within the scope of the present invention in its various embodiments.

Likewise, the repetition rate or frequency of the plurality of pulses will influence the temperature profile. In various embodiments, the plurality of pulses has a frequency of 200 kiloHertz (kHz.).

In various embodiments, within the glass, the femtosecond laser induced temperature profile is tailored to allow for crystallization upon heating ahead of the laser focus. The crystal's c-axis orients parallel to the temperature gradient (see Example 1, Discussion section), leading to a single crystal line with c-axis misorientation (c-axis here refers to an axis along the path) (FIGS. 4 and 5). The crystal cores exhibit a continuous, radially symmetric misorientation relative to the center of the crystal where the crystal possesses c-axis orientation parallel to the laser scanning direction (FIG. 5). The misorientation angle varies linearly with the radial distance from the center of the crystal (FIG. 5). In various embodiments, the crystal is a negative uniaxial crystal. In various embodiments, the crystal is lithium niobate. The misorientation results in a parabolic graded refractive index spatial profile with the refractive index highest in the very center of the crystal (FIG. 7 and Example 1, discussion section). This refractive index contrast leads to tight optical confinement of transmitted light in a Gaussian profile (FIGS. 7 and 8). Such a profile will lead to very low intensity near the crystal-glass interface (FIG. 8).

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

The materials and methods utilized in the following example are here described.

Glass Preparation.

Lithium niobosilicate glass of composition 35 $Li_2O$-35 $Nb_2O_5$-30 $SiO_2$ was made by mixing high purity $SiO_2$ (99.99%), $Li_2CO_3$ (99.999%), and $Nb_2O_5$ (99.9985%) reagents into a 40-g batch. The mixture was melted in a Pt crucible at 1400° C. for one hour, and the melt was subsequently quenched between two steel plates at room temperature. The glass was annealed in an oven at 500° C. for 2 hours to relieve stresses, before cooling down slowly to room temperature. The glass was then cut into rectangular pieces of roughly 10 mm×10 mm×2.5 mm dimension and polished to optical quality.

Laser-Induced Crystallization.

A PHAROS femtosecond laser (model: SP-06-200-PP, Light Conversion, Vilnius, Lithuania) was used to create the crystals in glass. The laser was operated at a wavelength of 1026 nm, repetition rate of 200 kHz, and pulse duration of 175 fs. The laser polarization was oriented parallel to the laser scanning direction. The light was focused through a Nikon extra-long working distance 50× objective with 0.6 NA. The glass piece was mounted on a heated stage brought to 500° C. to eliminate cracking during crystal growth. The heated stage was mounted on motorized stages, enabling 3D motion of the laser focus within the glass. Laser scanning speed was varied between 15 and 75 µm/s and laser power density (power) was varied between 151 $GW/m^2$ (515 mW) and 243 $GW/m^2$ (830 mW). The power was measured after the objective, but before the heated stage's 1 mm thick silica window. The crystals were grown at an actual depth of 200 µm below the surface of the glass.

Materials Characterization.

After writing crystal lines at the specified parameters, EBSD measurements and analysis were carried out using a Hitachi 4300SE scanning electron microscope and the analysis package Orientation Imaging Microscopy Analysis, respectively. Raman measurements were made with a WITec Raman microscope (alpha300 RA) utilizing a 532-nm laser.

The samples for these analyses were either cut and polished to expose the crystal cross-sections or polished down from the top surface to expose the crystals along their length. In either case, the sample was polished with progressively finer grits down to a 0.1 µm finish.

To simulate the dependence of the waveguiding characteristics on the corresponding refractive index profile, we utilized the MODE Solutions software (Lumerical Solutions, Inc.). To simplify the calculation, the waveguides were reduced to cylindrical symmetry.

Example 1: Fabrication of Graded Index Single Crystal in Glass

Lithium niobate ($LiNbO_3$) crystals were grown in 3D through localized heating by femtosecond laser irradiation deep inside $35Li_2O$-$35Nb_2O_5$-$30SiO_2$ glass. Laser scanning speed and power density were systematically varied to control the crystal growth process and determine the optimal conditions for the formation of single crystal lines. EBSD measurements showed that, in principle, single crystals can be grown to unlimited lengths using optimal parameters. There is a tendency for the crystal line's lattice to gradually rotate during growth until the c-axis is parallel to the laser scanning direction. The parameters have been successfully tuned to a growth mode where nucleation and growth occur upon heating and ahead of the scanning laser focus. The crystal cross-sections possessed a symmetric, smooth lattice misorientation with respect to the c-axis orientation in the center of the crystal. This growth mode eliminates the problem reported in previous works of non-uniform polycrystallinity because of a separate growth mode where crystallization occurs during cooling behind the scanning laser focus. The observed misorientation leads to a decrease in the refractive index of the crystal line from the center moving outwards, producing a graded refractive index single crystal (GRISC) optically active waveguide within the glass.

The growth of single crystal in glass has been explored due to its potential application in optical data transmission. Several crystals have been fabricated through continuous wave (CW) and femtosecond (fs) laser induced heating of the host glass. While crystal growth induced via CW laser heating is limited to the glass surface, fs laser induced crystallization allows for crystal growth deep inside the glass. The use of fs lasers to alter the properties of a host material has opened a compelling opportunity for expanding integrated optics into dense, 3D geometries. Besides growing single crystal waveguides in glass, in addition, amorphous waveguides in glass, depressed cladding, type I, and type II waveguides in bulk single crystal are all made possible by the spatially selective nonlinear absorption of fs laser irradiation in transparent materials.

Crystals can be nucleated and grown because high repetition rates lead to heat accumulation, which produces temperatures in and around the focal volume from hundreds to thousands of Kelvin. The ability to produce ferroelectric crystals, such as $LiNbO_3$ and $Ba_2TiSi_2O_8$ in glass, opens the opportunity to realize their large linear electro-optic effect and optical nonlinearity for use in electrooptic modulators and nonlinear frequency converters.

In particular, $LiNbO_3$ is of special interest due to its favorable properties that have already found widespread applications in optical modulators, frequency converters, and acousto-optical filters. $LiNbO_3$ crystals in glass have previously been fabricated on both the surface of glass via CW laser irradiation and within glass via fs laser irradiation. However, a significant problem remains that the fs laser precipitated $LiNbO_3$ crystals in glass possess a noticeably nonuniform, polycrystalline structure. These results point to a need to precisely control the interplay of nucleation and growth of crystals within the dynamic heating profile induced by the laser.

It requires a careful optimization of fs laser parameters and glass composition. Taking into consideration the material constraints and desired application for the crystal, one could then select between various crystal growth modes such as an all-solid state glass→crystal transformation produced by a heat profile that yields convex crystal growth front ahead of the scanning laser focus, or via melt→solid transformation that occurs with a concave crystal growth front behind the scanning laser focus.

The invention provides the formation of uniform, highly oriented $LiNbO_3$ crystals in lithium niobosilicate glass of effectively unlimited length, which is constrained only by the homogeneity of the starting glass. The specific growth dynamics and the confined nature of the crystal growth method lead to new phenomena in terms of crystal orientation that can be studied in our high quality, highly oriented single crystal line: (1) After nucleation, the crystal orientation rotates until its c-axis is oriented along the laser scanning direction. (2) Once the crystal is oriented in this way, a systematic, gradually varying misorientation of the crystal axis that is symmetric in regards to the center of the crystal line cross-section. The second characteristic indicates that the parameters have been controlled such that the growth occurs upon heating in a convex growth front ahead of the scanning laser focus. The second characteristic of these crystal lines is expanded by detailing their potential application as graded index crystal waveguides in glass.

Results

FIG. 1A displays the influence of varying laser scanning speed on the crystal shape, size, and microstructure, while keeping the laser power density constant. The figure shows x-axis inverse pole figure (IPF) maps of crystal lines and their cross-sections for crystals written at a power density of 243 $GW/m^2$ and at a scanning speed of 25, 35, 55, or 75 μm/s. A schematic in FIG. 1C illustrates the coordinate system used for electron back scatter diffraction (EBSD) analysis: the x-axis is parallel to the laser scanning direction; the z-axis is perpendicular to the sample surface; and the y-axis is perpendicular to both the x-axis and z-axis. Each IPF map is overlaid with an image quality map to darken areas where a quality Kikuchi pattern could not be measured, such as in the glass, at crystal grain boundaries, or along cracks or grooves created during polishing. Within the crystal, the Kikuchi patterns observed correspond to a $LiNbO_3$ crystal structure.

A trend is exhibited in FIG. 1A where the crystallized volume decreases with increasing scanning speed. In addition, the scanning speed has a clear impact on the degree of polycrystallinity of the crystal line as noted in terms of the number and size of grains of varying orientation (i.e. colors in the figure). Parameters were found at which crystal lines where essentially the entire crystallized area in the cross-section is a single crystal (such as the 25 μm/s case in FIG. 1A) could be created with the c-axis nearly parallel to the scanning direction. As the scanning speed is increased, the single crystal is broken up into many grains, which increase in number and decrease in size.

Expanding the search of the parameter space in terms of laser heating, FIG. 2A displays the combined influence of both laser scanning speed and power density on crystal growth. The figure shows x-axis IPF maps of crystal line cross-sections for a variety of parameters. Several observations can be made from this figure. First, decreasing the power density reduces the crystallized volume. In addition, consistent with the results shown at 243 GW/m² in FIG. 1A, at all power densities, increasing the scanning speed results in a reduction of the crystallized volume. Also at all power densities, as the scanning speed is increased, there is a transition from single crystal cross-sections to polycrystalline cross-sections with decreasing grain size (20-30 µm down to 2-3 µm). It is clear from FIG. 2A that for lower power densities this transition occurs at slower speeds.

The properties of the crystal lines formed with the best-case parameters (such as 243 GW/m² and 15 µm/s; 243 GW/m² and 25 µm/s; and 209 GW/m² and 15 µm/s) were characterized. A Raman spectrum is shown in FIG. 3A for the crystal line grown at 209 GW/m² and 15 µm/s, along with Raman spectra for the host glass and a reference stoichiometric $LiNbO_3$ (SLN) single crystal. Raman spectroscopy probes the vibrational modes of the crystal and reveals a collection of characteristic peaks, which allow us to identify the crystal structure. Consistent with the Kikuchi patterns acquired from EBSD, the Raman spectrum of the crystal in glass is indicative of a $LiNbO_3$ crystal structure. The apparent peak broadening of the Raman modes of the crystal in glass relative to the stoichiometric, unconfined single crystal can be attributed to the crystal in glass deviating in composition from stoichiometric $LiNbO_3$, as well as inhomogeneous stresses from confinement by glass matrix.

In the backscattering geometry detailed in FIG. 3B, one would expect that the crystal line was c-axis oriented, based on the x-axis IPF map of this crystal in FIG. 2A. Then the Raman spectrum should appear as that of bulk z-cut $LiNbO_3$ in backscattering geometry with laser probe beam incident along the c-axis. Our measurement of a bulk z-cut stoichiometric $LiNbO_3$ Raman spectrum in FIG. 3A is indeed similar to the Raman spectrum of the crystal line grown in glass.

An x-axis IPF map of the crystal line written at 209 GW/m² and 15 µm/s in FIG. 4A exhibits uniform coloration that is indicative of single crystal over a length scale of 100 Also, FIG. 4B shows a map of angular misorientation with respect to the c-axis oriented parallel to the laser scanning direction, revealing a unique feature as yet unobserved in previous works. There is a discernible lattice misorientation which increases smoothly outward from the crystal center. EBSD provides us with the exact lattice orientation at each point in our map. However, a scalar misorientation map can lead to some ambiguity in the exact lattice orientation with respect to the reference direction. To clarify this, we show a representative case of the lattice orientation along the crystal line's width in FIG. 4D. FIG. 5A features the angular misorientation in the crystal line's crosssection, revealing a radially symmetric misorientation with respect to the center of the crystallized volume. The misorientation angle varies linearly as a function of distance from the center and reaches a maximum of 15°.

Figures 6A, 6B, 6C:
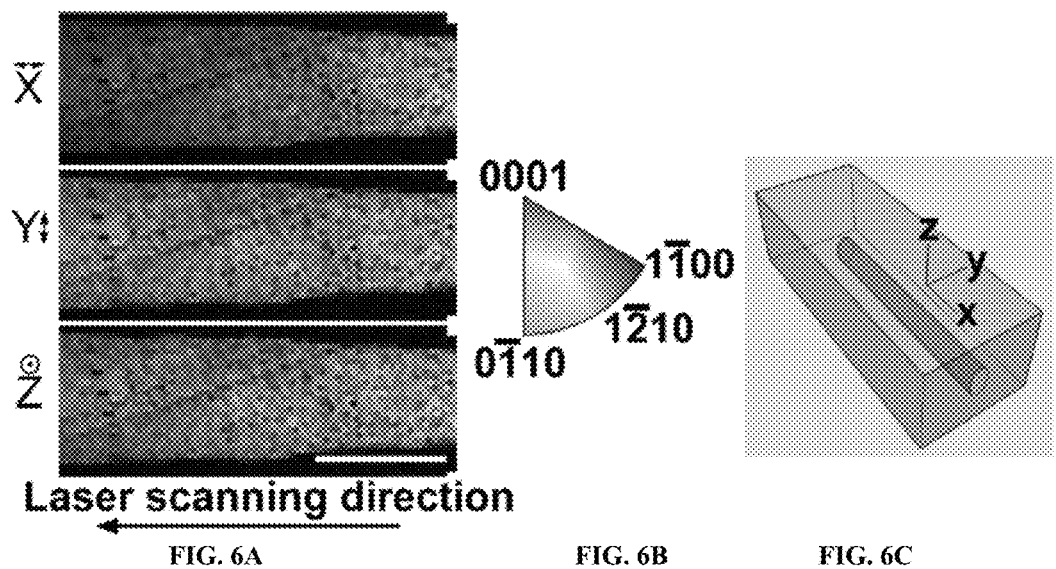
FIGS. 6A-C depict lattice rotation towards c-axis orientation in laser induced crystals in glass.

Another intriguing aspect of the crystal growth is a gradual crystal rotation towards c-axis oriented crystal lines. This feature is somewhat evident in FIG. 1A for the crystal grown at 243 GW/m² and 25 µm/s. There, the x-axis IPF map shows a transition in color from greenish-orange to a deeper color orange along the growth direction from left to right. A clearer example of such a rotation is shown in FIG. 6A for another crystal line grown under the same condition. The crystal ultimately aligns itself with the c-axis parallel to the laser scanning direction.

Discussion

The results presented in FIGS. 1A, 2A, and 4A show that there are parameters of laser scanning speed and power density at which single crystals can be grown reproducibly. The ability to grow crystals of practically unlimited length is an important step toward enabling evaluation of the potential of $LiNbO_3$ single crystal lines in glass for optical applications such as waveguiding.

One interesting feature is that the crystal rotates until the c-axis is oriented parallel to the laser scanning direction. At the crystal's nucleation point, such as at the right end of FIG. 4A, a group of randomly oriented crystals are formed. A seed with its c-axis exactly parallel to the scanning direction is not at the leading edge or is not able to immediately dominate the growth.

Rather, there is a gradual rotation from a random orientation toward the c-axis that is parallel to the laser scanning direction. Upon reaching this orientation the crystal continues to grow with c-axis orientation. Eventually, the growth is interrupted, as shown in FIG. 4A, due to either glass inhomogeneity or translation stage instability. Subsequently, after a new nucleus forms, the same process starts again. If this rotation of crystal orientation can be controlled, we believe it should be useful in quasi-phase matching nonlinear interactions.

Some previous work can be brought into perspective by the present results. The correlation between laser scanning speed and crystal grain size presented in FIGS. 1A and 2A can explain why He, X. et al. (Size-controlled oriented crystallization in SiO2-based glasses by femtosecond laser irradiation. J. Opt. Soc. Am. B 31, 376 (2014)) did not observe the formation of single crystal lines. Apparently, because the polycrystallinity begins to occur at slower speeds for lower power densities, even at the slow writing speed of 5 µm/s used in that work, the low power density used would have resulted in polycrystalline structure, as predicted by the results of FIG. 2A. Another aspect of their work which can be explained, is the oscillation in brightness along the crystal lines in the second harmonic (SH) microscopy images. This is likely a result of the crystal rotation we observe in FIGS. 1A and 6A.

The x-axis IPF map in FIG. 6A shows that the crystal rotates to c-axis parallel to the laser scanning direction, and the y-axis IPF map shows that it was originally perpendicular to the laser scanning direction. Such a rotation would cause a significant variation in the SH microscopy images. The lattice misorientation map in FIG. 4D gives us information about crystal alignment, from which we can infer details about the crystal growth dynamics. Other works have explained the tendency for oriented crystal growth along the laser induced temperature gradient. The observed misorientation arises when crystal nucleation and growth occur during heating at the leading end of the laser focus. Nuclei formed at the leading end of the laser focus will align with their c-axis parallel to the temperature gradient, resulting in the lattice arrangement illustrated in FIG. 4D. The result is a convex growth front where at each point along the front, the c-axis grows perpendicular to it.

Figure 5B:
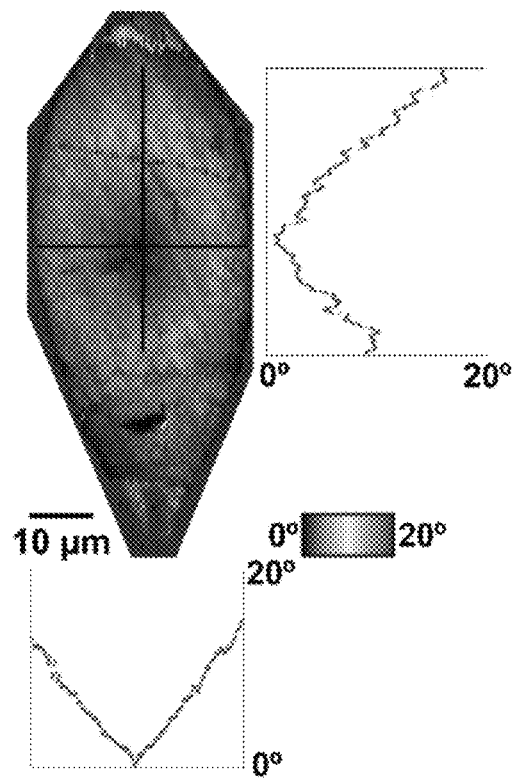

It is remarkable that the misorientation continues all the way to the center of the crystal, as shown in FIG. 5B. This could be a sign that the crystal is not being melted as the laser focus passes by. If melting had occurred, crystal nucleation and growth would reoccur upon cooling at the trailing end of the laser focus. Hence if melting would have occurred within the focus but off-center, the c-axis would tilt inward due to the orientation of the temperature gradient at the trailing end of the laser focus. However, an outward tilt for the off-center area is observed. The possibility that the very center of the crystal was melted cannot be completely ruled out since for that region the direction of the heat profile is identical during heating and cooling.

Parameters at which a different crystal growth mode occurs, resulting in crystallization during heating ahead of the laser focus. Partly, this could be attributed to the lower repetition rate used for these experiments (200 kHz). A lower repetition rate leads to less heat accumulation, directly impacting the temperature profile. The reduced temperature profile does not wipe out crystallization ahead of the laser focus, allowing this growth mode to dominate.

The limiting factor which restricts the single crystal line length to ~100 μm and ultimately causes a disruption in the crystal growth is glass inhomogeneity, appearing as striations within the glass. The stability of sample translation stage is also a likely source of disruption of crystal growth. Improved glass quality to reduce inhomogeneity, will allow crystal growth to much longer dimensions.

There is enormous potential for enhancement of the crystal line's optical waveguiding capabilities due to the radial lattice misorientation observed in the crystal cross-section—see FIG. 5. As shown below, the misorientation leads to a graded index crystal that enhances optical mode confinement. A graded index profile also offers other advantages such as the ability to create a microlens, low crosstalk in multi-channel transmission, and a reduction in intermodal dispersion.

The refractive index profile within the crystals was deduced using the misorientation angle maps of FIG. 5. In a negative uniaxial crystal, such as $LiNbO_3$, the refractive index experienced by the extraordinary ray varies with the angle θ between the propagation direction and the optic axis. The refractive index for the extraordinary ray is given by:

$$n(\theta) = n_o n_e / (n_o^2 \sin^2(\theta) + n_e^2 \cos^2(\theta))^{(1/2)} \quad (1)$$

where $n_e$ and $n_o$ are the extraordinary and ordinary refractive indices, respectively. The Taylor series expansion of equation (1) gives the following approximate expression for the refractive index profile:

$$n(\theta) \approx n_o(1 + (1/2)(1-(n_o/n_e)^2)\theta^2) \quad (2)$$

As shown in FIG. 5, the misorientation angle linearly increases with the radial distance from the center of the crystal. Thus, the refractive index profile has a parabolic spatial variation, the same as graded index fibers:

$$n(\theta) \approx n_o(1 + (1/2)(1-(n_o/n_e)^2)m^2 x^2) \quad (3)$$

where m is the slope of the misorientation angle vs. position curve (about 1.5°/μm).

One can compare the theoretical calculations of the mode profiles for radially symmetric graded index and step index waveguides. Applying equation 1, the misorientation of approximately 15° leads to a refractive index variation from the center to the surface of the crystal of approximately $\Delta n_{Gr}=0.0051$, using the refractive indices of $LiNbO_3$: $n_e=2.1381$ and $n_o=2.2112$ at λ=1550 nm. The step index between crystal and glass $\Delta n_{S.I.}$, while not known, was taken to be on the order of a few tenths: $\Delta n_{S.I.}=0.2$. Graded index and step index waveguides of 10 μm radius were simulated using MODE Solutions software. Each waveguide's fundamental mode profile of the electric field, along with its corresponding refractive index profile, is shown in FIG. 7.

All radial refractive index distributions can have their corresponding fundamental modes approximated by a Gaussian profile. Shown in FIG. 8 is an intensity line profile for each waveguide along with its Gaussian fit. The full-width-at-half-the-maximum (FWHM) is 9.2 μm for the step index mode and 6.8 μm for the graded index mode. Most notable in terms of waveguiding properties, the graded index profile within the crystal dominates over the step index profile from crystal to glass. For the case of the graded index profile, the optical mode is almost completely guided within the crystal, reaching very little into the interface region between the crystal and the glass, shown schematically as gray blocks in FIG. 8. This mode confinement will drastically reduce the scattering at the rough crystal-glass interface. The advantage could be further enhanced by increasing the index gradient m. For example, a twofold increase of m from the current experimental values of 1.5°/μm would further reduce the FWHM of the intensity profile to 4.8 μm.

In conclusion, an exploration of the parameter space of laser scanning speed and power density for growing $LiNbO_3$ crystals within $35Li_2O-35Nb_2O_5-30SiO_2$ glass led to virtually the entire crystallized volume as a single crystal. This accomplishment eliminates the problem of polycrystallinity in a large percentage of the crystallized volume which would be detrimental to the potential waveguiding capabilities of the crystal line. A propensity for the crystal line's lattice to rotate during growth until the c-axis is oriented along the laser scanning direction was observed. A growth mode where nucleation and growth of the crystal line occur upon heating and ahead of the laser focus was established by optimally adjusting the parameters of laser power density and scanning speed. This growth mode was confirmed by the radially symmetric crystal lattice misorientation with respect to the center of the crystal. The resultant graded index profile due to this lattice misorientation improves the crystal line's waveguiding ability through an enhanced mode confinement, reducing scattering at the crystal-glass interface.

Example 2: Measurement of Rotation Rate and Misorientation Rate in Crystals in Glass The lattice misorientation and rotation illustrated in FIGS. 4 and 6, respectively, are features present in all crystals that do not exhibit extreme polycrystallinity. To distinguish these two features, misorientation refers to changes in lattice orientation transverse to the laser scanning direction, while rotation refers to changes in lattice orientation along the laser scanning direction. It would be useful to better understand how the misorientation rate (also referred to as the graded index) changes with crystal growth parameters such as laser scanning speed, since m dictates the degree of mode confinement in the graded index waveguide. In addition, understanding the rotation would allow the conception of a quasi-phase matching scheme similar to that used in periodically poled $LiNbO_3$ waveguides.

The IPF color maps illustrate misorientation and rotation nicely, but to conduct a quantitative analysis of the misorientation, grayscale maps were generated detailing the deviation in degrees from a reference direction. From these grayscale maps, line profiles can be obtained showing how the deviation angle changes over the length of the crystal. Line profiles were taken as shown in FIGS. 10 and 13.

In the case of the misorientation rate, the profiles appeared as absolute value functions. The misorientation rate (the slope) is not always the same on each side of the origin, so each side was tied to a line, and the two slopes were averaged together.

Figure 14:
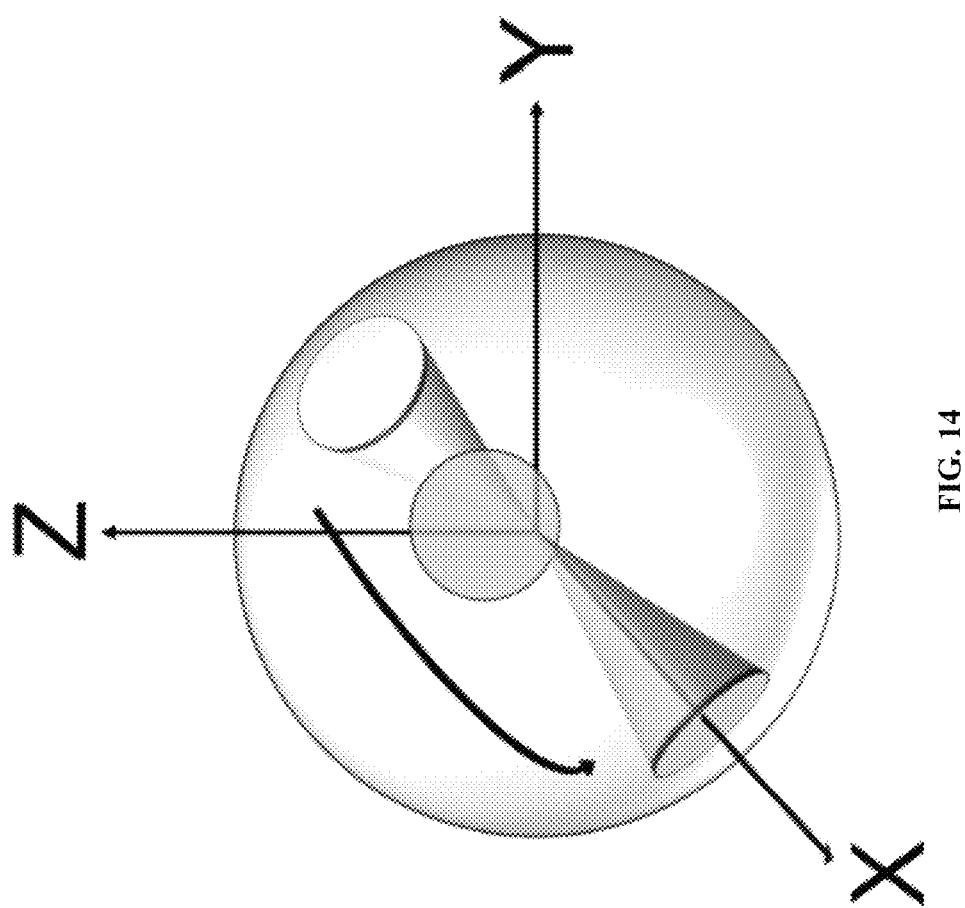
FIG. 14 depicts a schematic of the rotation in lithium niobate crystals in glass. The rotation of the cone represents the rotation of the c-axis towards the laser scanning direction (defined as the x-axis). The c-axis is in the center of the solid angle subtended by the cone, and the solid angle is the misorientation of the crystal.

In the case of studying the rotation rate, the profiles mostly appeared as shown in FIG. 13A, with an exponential decay of the deviation angle from the reference direction over the length of the crystal. There were some profiles which appeared linear, and a couple of profiles appeared as sigmoid functions. However, the majority had a decaying exponential shape. It is interesting to note that the rotation profile for fs laser written lithium niobate crystals in glass is predominantly not linear. Rather the rotation is more complicated in lithium niobate crystal lines. There is not a fixed crystal orientation parallel to the plane of the surface. There are also two effects on the lattice alignment, misorientation and rotation. This can be envisioned as in FIG. 14. The rotation of the cone represents the rotation of the c-axis towards the laser scanning direction (defined as the x-axis). The c-axis is in the center of the solid angle subtended by the cone, and the solid angle is the misorientation of the crystal.

There are two quantities of interest in fitting the rotation profiles with an exponential decay, $y=Ae^{-bx}$: the length scale over which the rotation occurs (1=b) and the initial magnitude of the deviation angle relative to c-axis orientation (A). To acquire decent data about the initial magnitude of the deviation angle, fits were only performed in those cases where a line profile could be taken right after an interruption in growth occurred or a V-shaped grain boundary formed. While the crystals show a tendency to ultimately align with the c-axis parallel to the laser scanning direction, the initial orientation after a V-shaped grain boundary deviates significantly from this alignment.

Tables showing the comprehensive results for the misorientation rate and rotation rate over the parameter space of composition, laser scanning speed, and laser power are shown in Tables 1, 2, and 3, below.

TABLE 1

Table of measured misorientation rates of crystals in glass, categorized and averaged in groups of the same laser scanning speed.

| Composition | Laser Scanning Speed (μm/s) | Laser Power (mW) | Misorientation Rate (°/μm) |
| --- | --- | --- | --- |
| LNS 34 | 5 | 830 | 1.49 |
| LNS 34 | 5 | 715 | 1.81 |
| LNS 34 | 5 | 715 | 1.62 |
| LNS 34 | 5 | 715 | 1.87 |
| LNS 34 | 5 | 610 | 1.76 |
| LNS 34 | 5 | 610 | 1.49 |
| LNS 34 | 5 | 610 | 1.39 |
| LNS 34 | 5 | 610 | 1.75 |
| LNS 34 | 5 | 610 | 1.54 |
| LNS 34 | 5 | 515 | 2.18 |
| | | | Ave. ± St. Dev. 1.69 ± 0.22 |
| LNS 30 | 15 | 955 | 0.64 |
| LNS 34 | 15 | 830 | 1.05 |
| LNS 34 | 15 | 830 | 1.01 |
| LNS 34 | 15 | 830 | 0.87 |
| LNS 34 | 15 | 715 | 1.13 |
| LNS 34 | 15 | 715 | 0.76 |
| LNS 34 | 15 | 715 | 0.80 |
| | | | Ave. ± St. Dev. 0.89 ± 0.16 |
| LNS 34 | 25 | 830 | 1.06 |
| LNS 34 | 25 | 830 | 1.13 |
| LNS 30 | 25 | 830 | 0.65 |
| LNS 30 | 25 | 830 | 0.90 |
| LNS 30 | 25 | 830 | 0.35 |
| LNS 30 | 25 | 830 | 0.57 |
| LNS 30 | 25 | 830 | 1.06 |
| LNS 30 | 25 | 830 | 0.97 |
| LNS 30 | 25 | 830 | 0.81 |

TABLE 2

Table of measured misorientation rates of crystals in glass, categorized and averaged in groups of the same laser scanning speed, continued.

| Composition | Laser Scanning Speed (μm/s) | Laser Power (mW) | Misorientation Rate (°/μm) |
| --- | --- | --- | --- |
| LNS 30 | 25 | 830 | 0.56 |
| LNS 30 | 25 | 830 | 0.80 |
| LNS 30 | 25 | 830 | 1.22 |
| LNS 22 | 25 | 810 | 1.24 |
| LNS 22 | 25 | 810 | 0.91 |
| LNS 22 | 25 | 610 | 1.24 |
| | | | Ave. ± St. Dev. 0.90 ± 0.27 |
| LNS 34 | 35 | 830 | 0.55 |
| LNS 22 | 35 | 810 | 0.75 |
| LNS 22 | 35 | 810 | 0.71 |
| LNS 22 | 35 | 810 | 0.74 |
| LNS 22 | 35 | 610 | 0.65 |
| | | | Ave. ± St. Dev. 0.68 ± 0.07 |
| LNS 22 | 45 | 810 | 0.64 |
| LNS 22 | 45 | 610 | 0.61 |
| LNS 22 | 45 | 610 | 0.56 |
| | | | Ave. ± St. Dev. 0.60 ± 0.04 |
| LNS 22 | 55 | 610 | 0.61 ± 0.02 |

TABLE 3

Table of measured rotation rates of crystals in glass, categorized and averaged in groups of the same glass composition.

| Composition | Laser Scanning Speed (μm/s) | Laser Power (mW) | A (°) | b (1/μm) |
| --- | --- | --- | --- | --- |
| LNS 34 | 35 | 830 | 41.4 | 0.033 |
| LNS 34 | 25 | 830 | 41.9 | 0.034 |
| LNS 34 | 15 | 830 | 24.6 | 0.043 |
| LNS 34 | 15 | 830 | 52.4 | 0.013 |
| LNS 34 | 5 | 830 | 19.7 | 0.037 |
| LNS 34 | 5 | 715 | 28.8 | 0.052 |
| LNS 34 | 5 | 715 | 20.7 | 0.034 |
| LNS 34 | 5 | 715 | 71.8 | 0.082 |
| LNS 34 | 5 | 610 | 51.1 | 0.045 |
| LNS 34 | 5 | 610 | 48.0 | 0.054 |
| LNS 34 | 5 | 610 | 41.8 | 0.034 |
| LNS 34 | 5 | 610 | 52.3 | 0.033 |
| LNS 34 | 5 | 515 | 59.3 | 0.044 |
| | | | Ave. ± St. Dev. 42.6 ± 15.1 | Ave. ± St. Dev. 0.042 ± 0.015 |
| LNS 30 | 25 | 830 | 48.2 | 0.034 |
| LNS 30 | 25 | 830 | 55.5 | 0.028 |
| LNS 30 | 25 | 830 | 51.4 | 0.029 |
| LNS 30 | 25 | 830 | 27.2 | 0.079 |
| LNS 30 | 25 | 715 | 18.3 | 0.058 |
| LNS 30 | 25 | 715 | 19.9 | 0.063 |
| | | | Ave. ± St. Dev. 36.7 ± 15.3 | Ave. ± St. Dev. 0.049 ± 0.019 |
| LNS 22 | 55 | 610 | 19.6 | 0.026 |
| LNS 22 | 45 | 810 | 27.1 | 0.025 |
| LNS 22 | 35 | 810 | 29.3 | 0.019 |
| LNS 22 | 35 | 610 | 22.7 | 0.020 |
| LNS 22 | 35 | 610 | 26.3 | 0.029 |
| | | | Ave. ± St. Dev. 25.0 ± 3.5 | Ave. ± St. Dev. 0.024 ± 0.004 |

From this listing, some trends can be highlighted. It is apparent that as the laser scanning speed is increased from 5 to 35-55 μm/s, the misorientation rate decreases by a factor of 2. A factor of 2 would make the refractive index contrast within the crystal change by a factor of 4. The change in the misorientation rate can be explained by a warping in the shape of the temperature profile with increasing laser scanning speeds.

Figure 15:
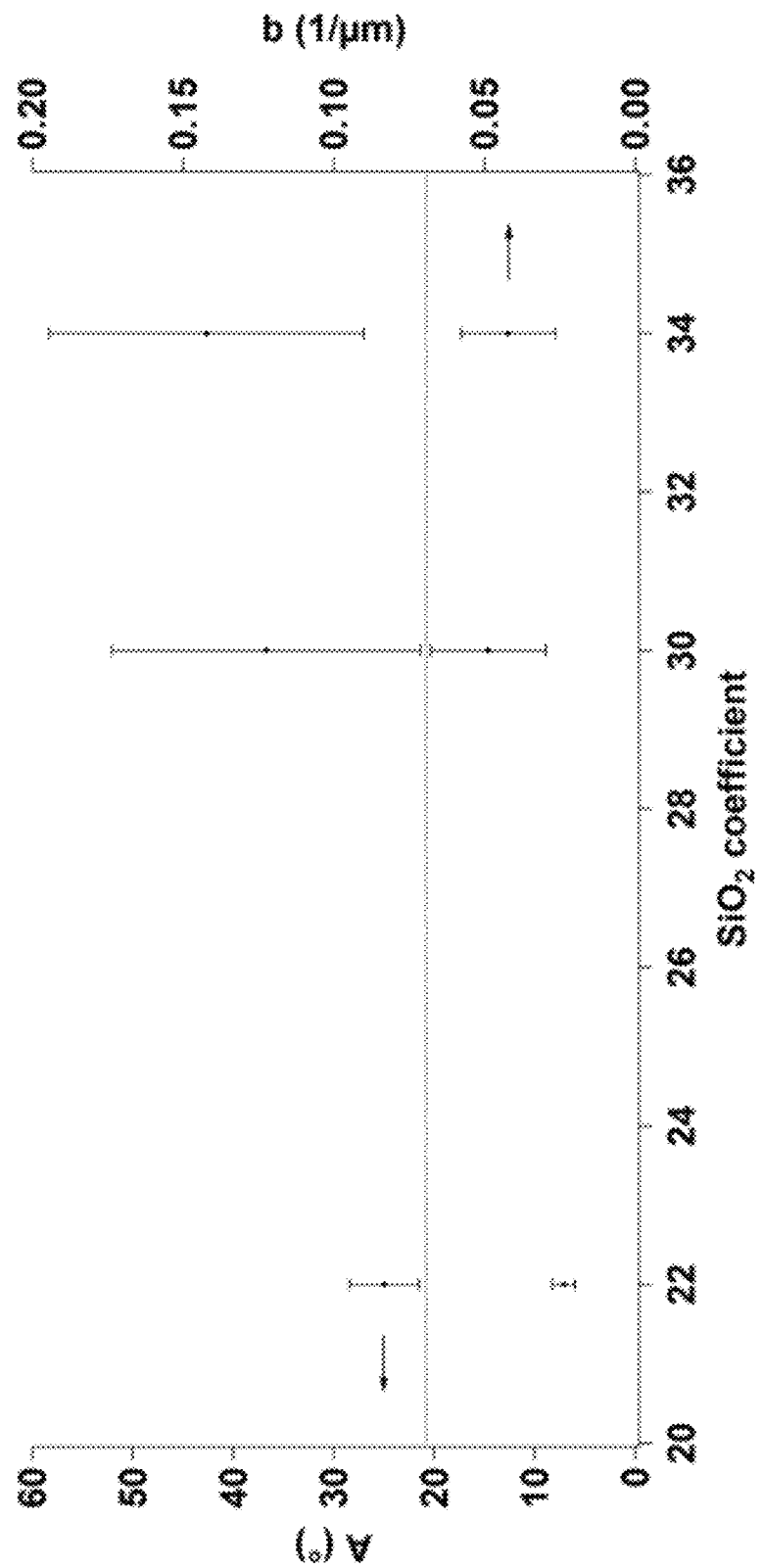
FIG. 15 depicts the variation of amplitude (A) and inverse length (b) parameters with glass composition.

The exponential fitting parameters describing the rotation rate are shown as a function of glass composition in FIG. 15. Crystals in LNS 22 show the lowest initial deviation angle relative to c-axis rotation. In addition, the crystals in LNS 22 shows the slowest rate of rotation towards c-axis orientation (smallest b). The low initial deviation angle in LNS 22 is potentially an indication that it is easiest in this composition to have a crystal that is already close to c-axis alignment nucleate at the leading edge of the growth front and dominate the growth. LNS 30 and 34 show a wide range of initial deviation angles at which the crystals form. This wide variability may be an indication of a stochastic process. The sample size is small, so it is difficult to make conclusive statements about the crystal lattice rotation.

While crystals formed in LNS 22 display the slowest rotation rate, they also start closest to c-axis orientation, meaning the predominant orientation along the crystal line is close to or directly parallel to the c-axis. The crystals in LNS 34 start with a large deviation angle from c-axis orientation, and for these particular laser processing parameters, the rotation rate is not especially high. As a result, the predominant orientation along the laser scanning direction is o of c-axis. The ability to grow crystals where the c-axis is not parallel to the laser scanning direction is potentially very valuable, as high non-linear optical coefficients such as $d_{33}$ can be accessed that would be unavailable with the c-axis oriented along the laser scanning direction.

Given that the observed rotation profiles are decaying exponentials, a differential equation can be written down to describe the rotation. As a function of distance along the crystal line, x, the deviation angle relative to the c-axis orientation along the laser scanning direction, θ(x), can be described by the differential equation:

$$d\theta/dx = -b\theta \quad (4)$$

Figure 16:
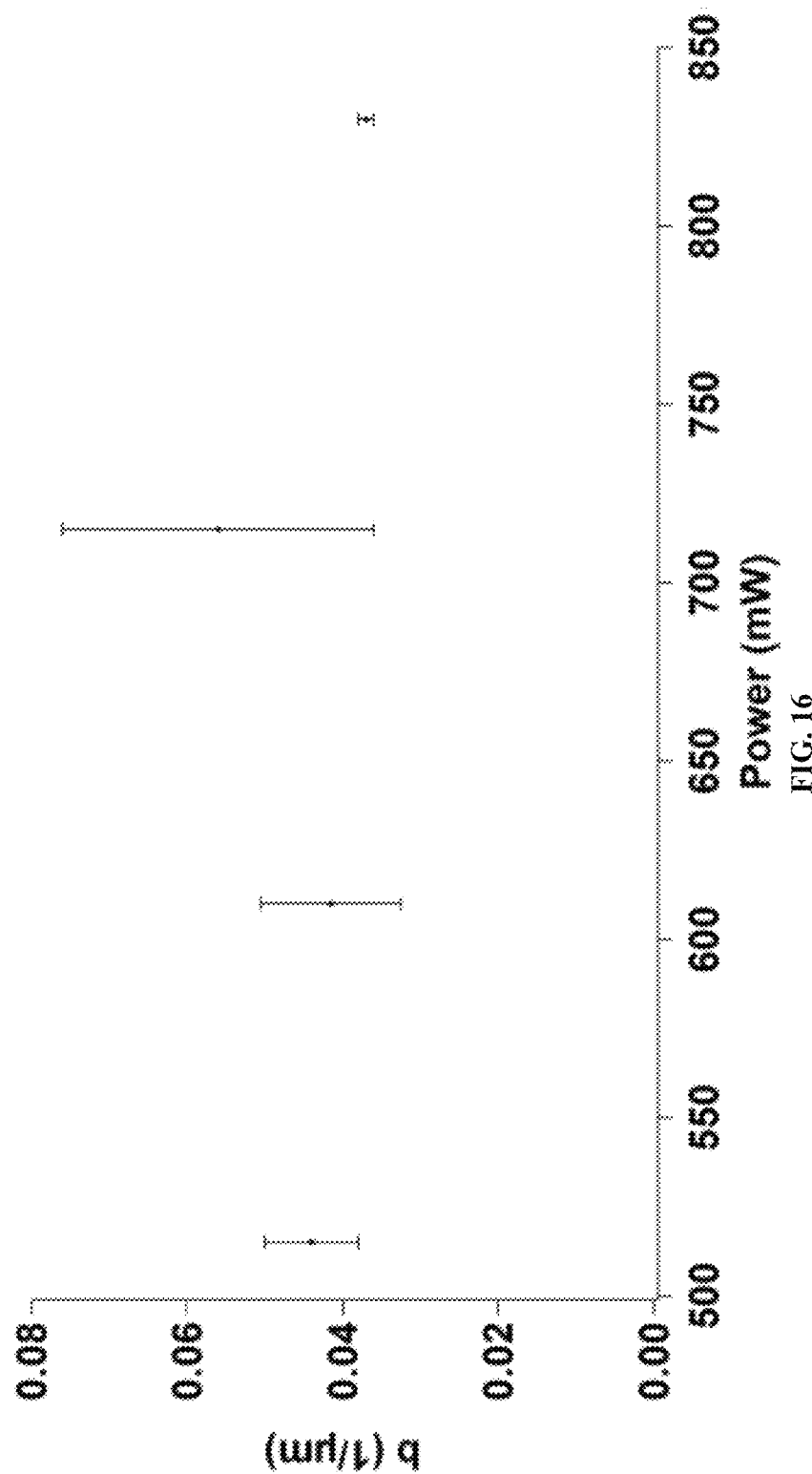
FIG. 16 depicts the variation of inverse length (b) with laser power. The data is taken from the LNS 34 section of Table 3 and only b values where the laser scanning speed is 5 μm/s are considered.

One conjecture for the meaning of b is that it depends on the steepness of the temperature profile induced by the fs laser, with steeper temperature profiles resulting in higher values of b (faster rates of rotation). The steepness of the temperature profile will depend on both the laser power and laser scanning speed. An increase in laser power generates a steeper temperature profile. An increase in laser scanning speed allows less heat accumulation in any one location, generating a gentler temperature profile. By fixing one of these variables, an inspection of Table 3 can test the hypothesis about the origin of b. In the LNS 34 section of Table 3, looking at the values of b for when the speed is held constant at 5 μm/s, one can observe how b varies with laser power. This is shown in FIG. 16, where the error for a collection of data points is the standard deviation, and the error for a single data point (as in the case of 515 and 830 mW) is taken from the error of the exponential fit. This data indicates that the rotation rate may not depend on the steepness of the temperature profile. A larger data set can further test this and other hypotheses about the origin of b.

Example 3: Study of Piezoelectric and Ferroelectric Properties of Lithium Niobate Crystals in Glass A defining property of ferroelectrics is that their spontaneous polarization can be flipped by applying a sufficiently high external electric field. Thus far, crystals which are ferroelectric in their bulk single-crystal form have been assumed to retain this property as laser-induced crystals in glass. It is unclear whether confinement in the glass would alter this property.

A preliminary attempt was made to pole the crystals in glass using a high voltage supply and liquid electrical contacts. However, the experiment was unsuccessful because this equipment was designed for poling bulk single crystals. The likelihood of poling the crystals in glass can be significantly improved by using a piece of equipment that provides a high electric field localized in the crystal in glass. This was accomplished through the use of a piezoresponse force microscope in switching spectroscopy mode.

In addition to proving that the lithium niobate crystals in glass are ferroelectric, another intriguing problem is to determine whether the piezoelectric properties of the confined crystals in glass correlate with the crystal lattice orientation. This has been shown to be the case for a confined crystallite of $LaBGeO_5$ produced through furnace heat treatment of $LaBGeO_5$ glass, but no similar study has yet been performed on laser induced crystals confined in glass. This question can be addressed by combining lattice orientation information gathered from EBSD with vector piezoresponse force microscopy.

Vector Piezoresponse Force Microscopy of Lithium Niobate Crystals in Glass

Spatial mapping of the vertical and lateral piezoresponses of the crystals in glass was also conducted. The goal was to observe a variation of the piezoresponse with lattice rotation. As a proof of principle of the effect of lattice orientation on piezoresponse, the piezoresponse was measured near a grain boundary, as shown in FIG. 17. As expected, when the c-axis of the crystal is perpendicular to the sample surface, the vertical piezoresponse is high, and when the c-axis of the crystal lies within the plane of the surface, the lateral piezoresponse is high.

With such a clear discrepancy in piezoresponse between two grains with the c-axis in perpendicular configurations, the expectation would be that as the lattice rotates from c-axis perpendicular to the surface to c-axis lying within the plane of the surface, the piezoresponse would gradually change. This was indeed observed, as seen in FIG. 18. As the c-axis rotates until it is parallel with the laser scanning direction (the x-axis), there is a gradual reduction in the vertical piezoresponse. A clear visualization of the change in the vertical piezoresponse with lattice rotation is shown in the 3D picture in FIG. 18D.

It is interesting to note that there are regions of low piezoresponse at the center of the crystal line in FIGS. 17 and 18. This may be attributed to phase separation into silica regions and lithium niobate regions. Regions containing silica would show a drop in piezoresponse. Low piezoresponse in the spatial maps can occur for reasons other than the presence of amorphous regions. As seen in FIG. 18, there is a high density of areas with low piezoresponse within the crystal.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A graded refractive index single crystal waveguide comprising:

a glass block containing at least one crystal core, the crystal core comprising:

a central portion extending along an axis from a first end to a second end;

an interface defining a peripheral boundary of the crystal core at a junction of the crystal core and an adjacent portion of the glass block, and a continuous, radially symmetric misorientation transverse to the central portion;

wherein the misorientation has a misorientation angle that increases with increasing distance from the central portion towards the interface.

2. The graded refractive index single crystal waveguide according to claim 1, wherein the crystal core is uniaxial and has negative birefringence.

3. The graded refractive index single crystal waveguide according to claim 1, wherein the crystal core is oriented along the central portion of the crystal core.

4. The graded refractive index single crystal waveguide according to claim 1, wherein the crystal core comprises $LiNbO_3$.

5. The graded refractive index single crystal waveguide according to claim 1, wherein the glass block comprises $35Li_2O$-$35Nb_2O_5$-$30SiO_2$ glass.

6. The graded refractive index single crystal waveguide according to claim 1, wherein the misorientation angle reaches a maximum of about 15° at the interface of the crystal core.

7. The graded refractive index single crystal waveguide according to claim 1, wherein the misorientation has a slope between about 0.5°/μm and about 2°/μm.

* * * * *